United States Patent [19]
Palvolgyi

[11] Patent Number: 5,921,424
[45] Date of Patent: Jul. 13, 1999

[54] CLOSURE DEVICE FOR A VEHICLE TANK FILLER NECK

[75] Inventor: Sandor Palvolgyi, Gleisdorf, Austria

[73] Assignee: Blau Internatiional GesmbH, Weiz, Austria

[21] Appl. No.: 08/875,271

[22] PCT Filed: Nov. 21, 1996

[86] PCT No.: PCT/AT96/00231

§ 371 Date: Jan. 26, 1998

§ 102(e) Date: Jan. 26, 1998

[87] PCT Pub. No.: WO97/18966

PCT Pub. Date: May 29, 1997

[30] Foreign Application Priority Data

Nov. 21, 1995 [AT] Austria .................................. 1894/95

[51] Int. Cl.$^6$ .......................... B60K 15/06; B65B 31/06
[52] U.S. Cl. ...................... 220/86.2; 141/301; 141/302; 141/348; 141/350
[58] Field of Search ................................. 220/86.1, 86.2, 220/86.3, 203.05, 203.07, 203.19, 203.22, 211, DIG. 33, 746, 749, 263, 825; 141/348, 301, 302, 350

[56] References Cited

U.S. PATENT DOCUMENTS

| | | | |
|---|---|---|---|
| 4,955,950 | 9/1990 | Seiichi et al. ........................... | 220/86.2 |
| 5,056,570 | 10/1991 | Harris et al. ........................... | 220/86.2 |
| 5,103,877 | 4/1992 | Sherwood et al. ..................... | 220/86.2 |
| 5,186,220 | 2/1993 | Scharrer ................................. | 220/86.2 |
| 5,271,438 | 12/1993 | Griffin et al. .......................... | 220/86.2 |
| 5,404,906 | 4/1995 | Aoshima et al. ....................... | 220/86.2 |
| 5,437,317 | 8/1995 | Takatsuka et al. ..................... | 220/86.2 |
| 5,791,387 | 8/1998 | Palvolgyi ............................... | 220/86.2 |

FOREIGN PATENT DOCUMENTS

| | | |
|---|---|---|
| 464 420 | 1/1992 | European Pat. Off. . |
| 43 43 498 | 12/1993 | Germany . |

*Primary Examiner*—Stephen K. Cronin
*Assistant Examiner*—Nathan Newhouse
*Attorney, Agent, or Firm*—Pillsbury Madison & Sutro L.L.P

[57] ABSTRACT

A closure device for a vehicle tank filler neck (1), which has an opening (3) provided with a flap (5) for the entry of the filling tube (4) of a fuel pump nozzle, wherein the flap (5) can be prestressed against the lower edge of the opening (3) by means of a spring (6), and an additional load in the closing direction can be placed on the flap (5) with the aid of an actuation device (11), wherein the actuation device (11) furthermore controls a selector valve (19) which, when the flap (5) is in the non-loaded position, connects the filler neck (1) below the flap (5) with a first recovery line (30) leading to the fuel vapor recovery container, but in the position where the flap (5) is under a load connects a pressure equalization line (25) connected to the vehicle tank with a second recovery line (24) of a narrower flow cross section leading to the recovery container and equipped with a roll-over valve.

4 Claims, 3 Drawing Sheets

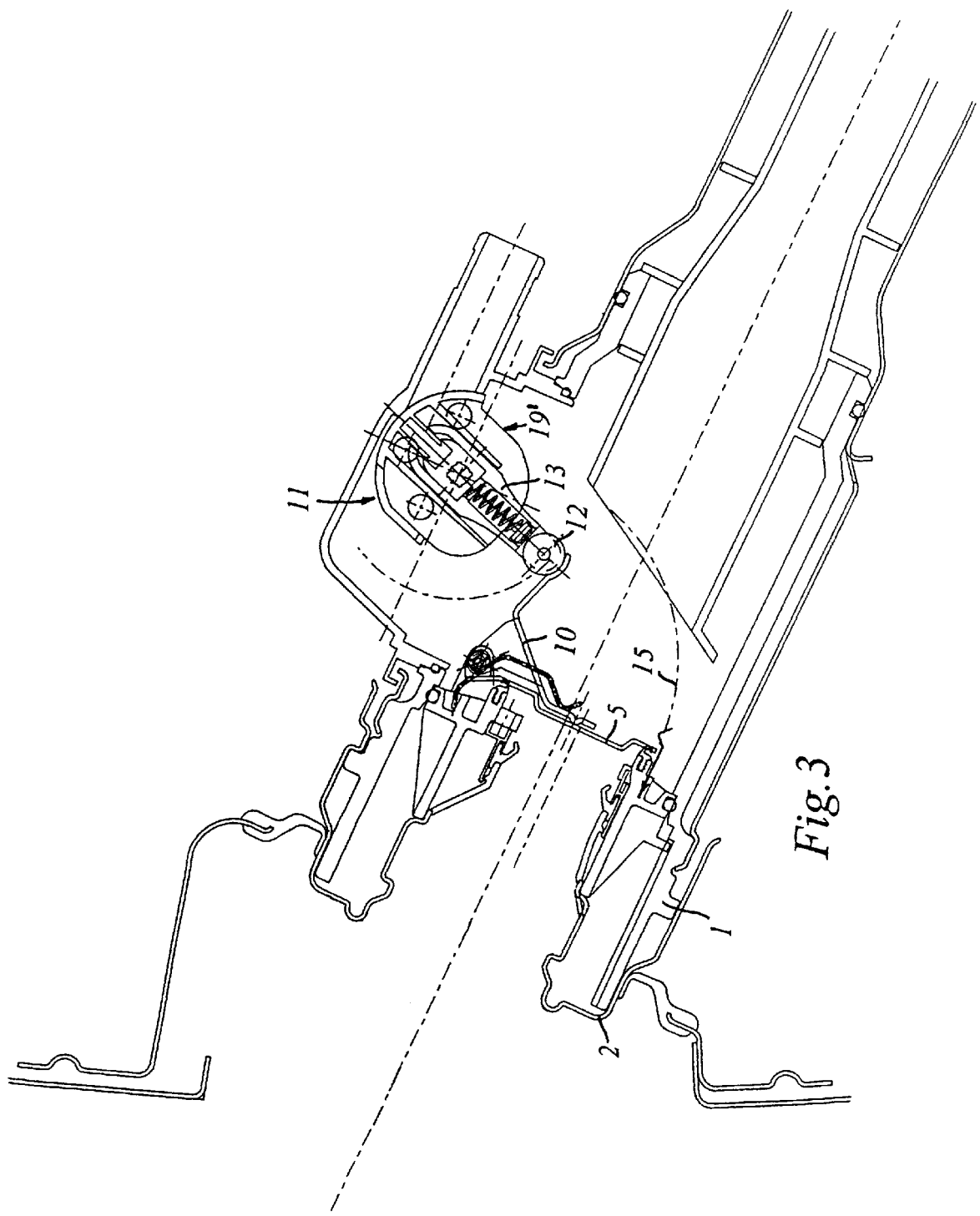

CLOSURE DEVICE FOR A VEHICLE TANK FILLER NECK

This application is the national phase of international application PCT/AT96/00231, filed Nov. 21, 1996 which designated the U.S.

FIELD OF THE INVENTION

The invention relates to a closure device for a vehicle tank filler neck, which has an opening provided with a flap for the entry of the filling tube of a fuel pump nozzle, wherein the flap is prestressed against the lower edge of the opening by means of a spring.

BACKGROUND OF THE INVENTION

It is necessary at present to combine closure devices for vehicle tank filler necks with additional, separate fluid switching elements in order to cover all functions and operational states of a vehicle tank. For example, an underpressure or overpressure valve is required in order to ventilate the vehicle tank for pressure equalization. Responsible treatment of the environment and recent requirements of the law have furthermore accelerated the development of so-called ORVR systems (On-board Refueling Vapor Recovery System), by means of which the fuel vapors created during filling—independently of a miscellaneous removal via the gas displacement line of the gas pump—as well as the vapors escaping during vehicle operation via the overpressure valve are caught in the vehicle ("on-board") in a recovery container provided with an activated charcoal filter. During vehicle operation the recovery container is washed by the combustion feed gases, which remove the fuel residue from the activated charcoal filter and furnish it to the combustion chamber. Therefore further valves are required, which during fill-up release appropriate aspirating and recovery openings and during vehicle operation release appropriate pressure equalization openings.

The latest regulations furthermore require a completely pressure-free operation of the vehicle tank in order to further reduce the emission of fuel vapors. The overpressure and underpressure valves used up to now for the pressure-equalized connection to the recovery container can therefore no longer be used and must be replaced by separate switching valves, which release the pressure equalization connection during vehicle operation.

The already widely used employment of a so-called overfill valve, which prevents the overfilling of the tank as far as into the filler neck, further increases the number of fluid switching elements.

OBJECT AND SUMMARY OF THE INVENTION

It is the object of the invention to further develop a closure device of the type mentioned at the outset in such a way that it contains all fluid switching elements required for the functioning of a vehicle tank. This object is attained in accordance with the invention in that an additional load in the closing direction can be placed on the flap with the aid of a contact pressure device, wherein the actuation device controls a selector valve which, when the flap is in the non-loaded position, connects the filler neck below the flap with a first recovery line leading to the fuel vapor recovery container, but in the position where the flap is under a load connects a pressure equalization line connected to the vehicle tank with a second recovery line of a narrower flow cross section leading to the recovery container and equipped with a roll-over valve.

The device in accordance with the invention combines the functions of a filler neck closure, an ORVR valve and a pressure equalization valve, which are controlled together with the release or closing of the flap.

In accordance with a particularly preferred embodiment of the invention it is provided that in the position where the flap is under a load, the selector valve connects the filler neck below the flap with an overfill line originating at the gas recovery chamber of the vehicle tank. The function of an overfill valve is also integrated in this way.

A further advantageous embodiment of the invention is distinguished in that the selector valve is a combined rotary and cross slide valve, wherein the first recovery line terminates at the circumference of a bushing in which the rotary and cross slide valve is seated and which is open toward the filler neck, while the pressure equalization line, the second recovery line and possibly the overfill line terminate in the front plate of the bushing. This construction takes the space requirements of the control opening of the first recovery line of a large diameter into consideration, which must remove the fuel vapors occurring during filling.

In this case it is particularly advantageous if in connection with a closure device, wherein the actuating device has a cam acting on the contact pressure finger, the cam is seated on the actuating shaft of the rotary and cross slide valve, which results in a compact arrangement.

The invention will be explained in more detail below by means of an exemplary embodiment represented in the drawings.

BRIEF DESCRIPTION OF THE DRAWINGS

FIGS. 1 to 3 represent the closure device in longitudinal section during a filling process, at the end of the filling process and during vehicle operation.

DETAILED DESCRIPTION OF THE PREFERRED EMBODIMENT

Figure 1:
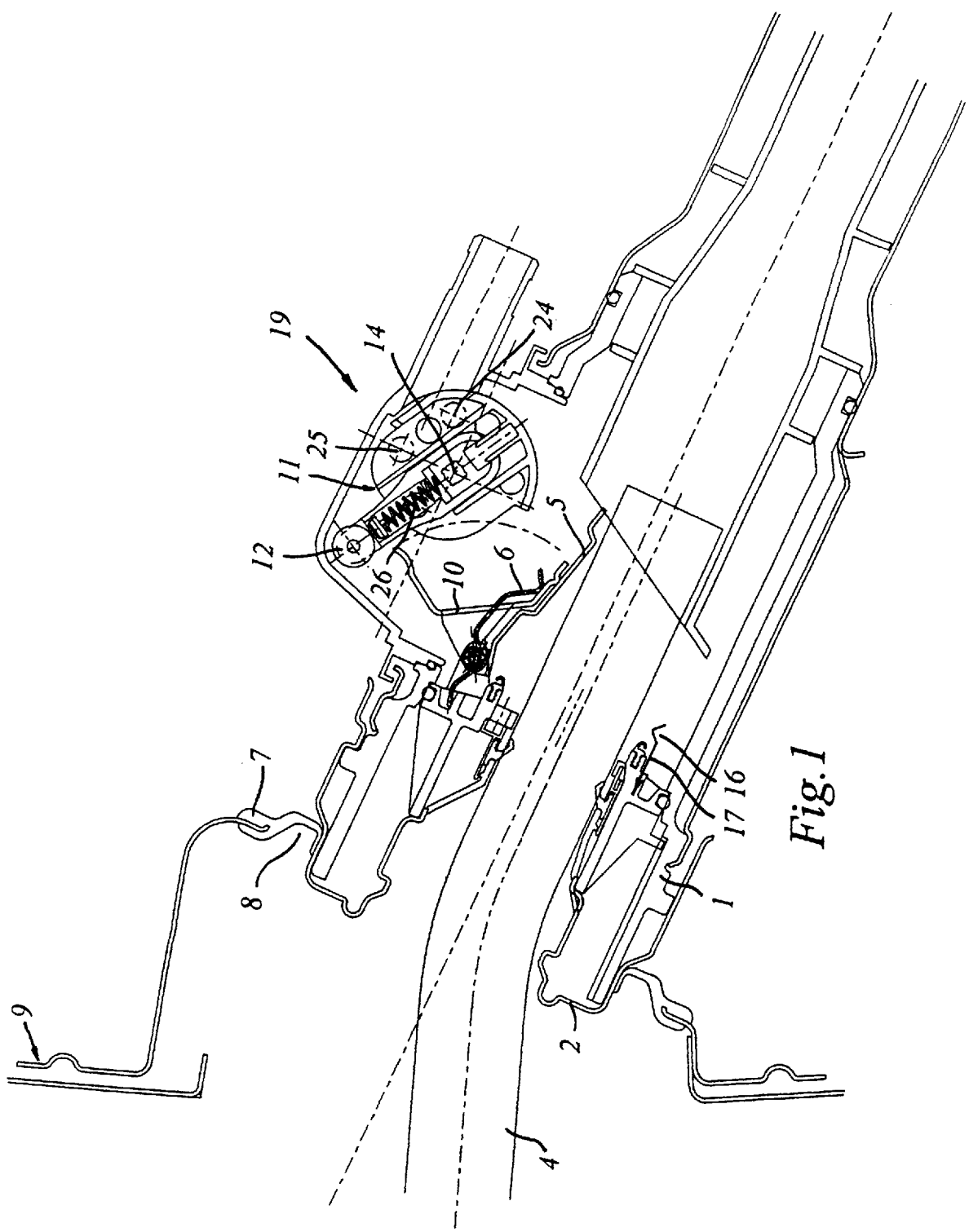
Figure 2:
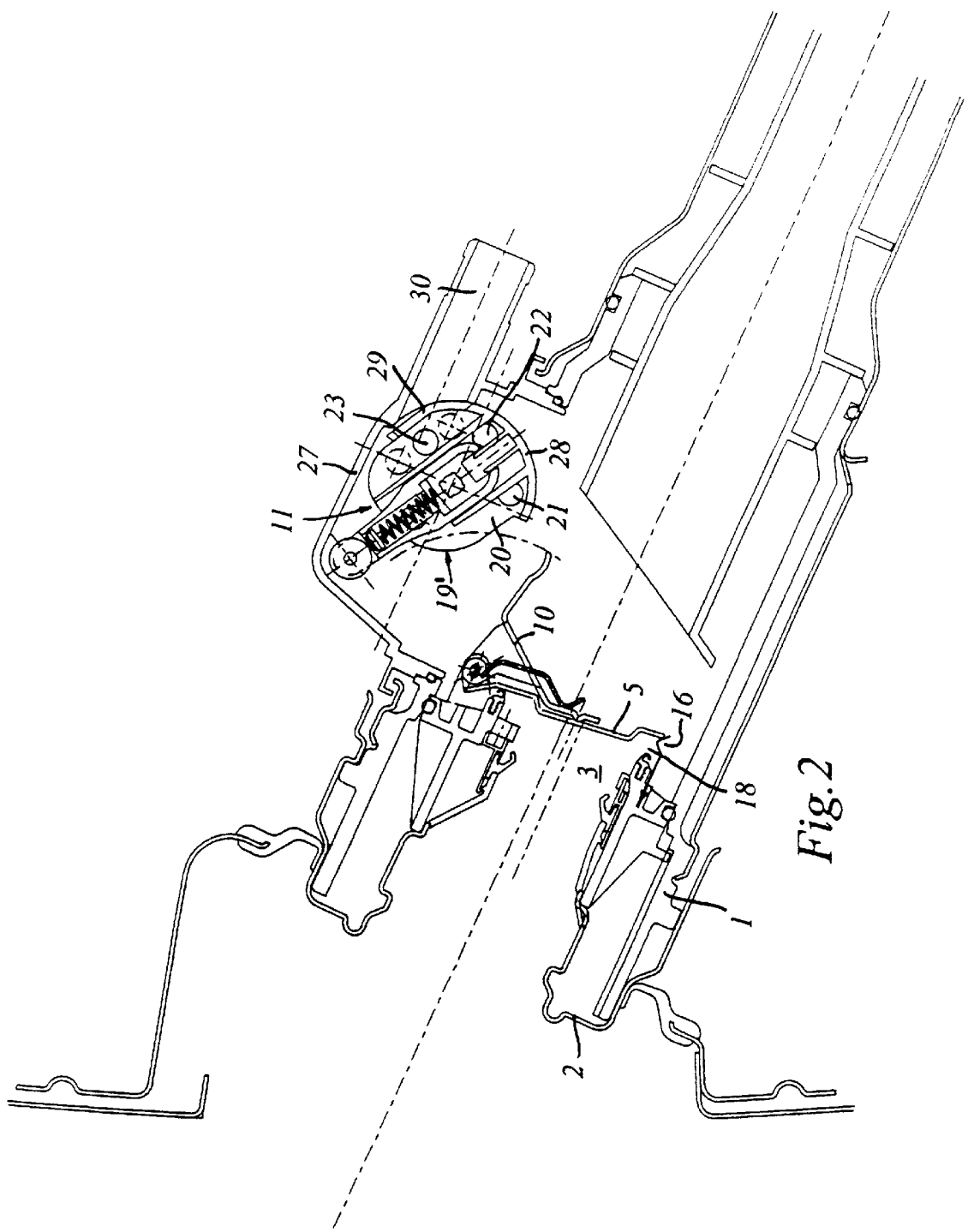

The upper end of a filler neck 1 is represented in FIGS. 1 to 3, whose lower end (not represented) leads to a vehicle fuel tank. An approximately cup-shaped insert 2 has been sealingly seated in the upper end of the filler neck 1, which on its lower end has an opening 3 of decreased diameter for the entry of the filling tube 4 of a fuel pump nozzle (not shown in further detail). The opening 3 can be closed by means of a flap 5, hinged on one side and prestressed against the lower edge of the opening by a spring 6.

The upper end of the filler neck 1, together with the insert 2, and with the interposition of a sealing sleeve 7, projects through an opening 8 in a recessed area of a vehicle body 9. The recessed area can be covered by means of an appropriate body flap (not represented).

A contact pressure finger 10 is hinged next to the flap 5 for the tight sealing of the opening 3 during vehicle operation, which can act against the underside of the flap 5 with the aid of an actuating device 11 (see FIG. 3). In the example represented, the contact pressure finger is a two-armed lever, and the actuating device includes a pivotable cam 13, which is provided with a spring-loaded contact pressure roller 12 on its end and which presses on the one lever arm of the contact pressure finger 10, whose other lever arm pushes against the underside of the flap 5 (FIG. 3). However, any other form of contact pressure device for the flap 5 is also possible in place of the represented contact pressure finger and actuation device construction.

Pivoting of the cam 13 takes place via a shaft 14, which is driven by means of a suitable, for example electrical, hydraulic or pneumatic servo motor (not represented). Manual actuation is also possible.

In order to let miscellaneous excess fuel remaining above the flap 5 after removing the filling tube 4 flow off into the tank, a detent projection 16 projects into the movement path 15 of the flap 5 in the area in front of its closed position. The detent projection 16 is formed by a radially inward directed furrow in a flexible tongue 17, which is clamped in the axial direction at the edge of the opening 3. The flap 5 is pushed past the detent projection 16 when the filling tube 4 is inserted (FIG. 1), and the flexible tongue 17 gives way elastically. When removing the filling tube 4 at the end of the filling process and when the contact pressure finger 10 has not yet been activated (FIG. 2), the flap 5 rests on the detent projection 16 prior to reaching its closed position, so that a small gap 18 remains for the rest of the fuel to run off.

The closure device combines all fluid switching elements required for building an ORVR system, as well as some further elements necessary in connection with vehicle tanks, as will be described in more detail below. In the example represented, the drive shaft 14 of the actuating device 11 is the control shaft of a 5/2-way valve 19, which contains a combined rotary and cross slide valve 19'. The rotary and cross slide valve 19' has a control plate 20, which is provided with control bores 21 to 23 arranged centered around the shaft 14, which can be brought into alignment with connecting bores 24 to 26 in a fixed front plate (not shown) resting against the control plate 20. The front plate is an element of a bushing 27, in which the rotary and cross slide valve 19' is seated, and which is open toward the interior of the filler neck and is formed out of the wall of the filler neck 1.

An apron 28 in the shape of a semicylindrical shell, in which a radial control opening 29 has been cut, which can be aligned with a connecting opening 30 at the circumference of the bushing 27, extends upward on the circumference of the control plate 20.

The control bores 21 to 23 and the control opening 29 of the rotary and cross slide valve 19' are arranged in respect to the connecting bores 24 to 26 and the connecting opening 30 in such a way that in the unloaded position of the flap 5 represented in FIGS. 1 and 2 the connecting bores 24 to 26 are closed and the connecting opening 30 is connected with the interior of the filler neck, while in the loaded position of the flap 5 represented in FIG. 3 the connecting bores 24 to 26 are connected with the interior of the filler neck and the connecting opening 30 is closed.

The allocation of the connecting bores 24 to 26 and of the connecting opening 30 is as follows. A recovery line for fuel vapors is connected to the connecting opening 30, which leads to a fuel vapor recovery container (not represented), which is equipped with an activated charcoal filter for absorbing the fuel vapors. Combustion feed gases are flowing through the recovery container during the operation of the vehicle, which dissolve the fuel residue out of the activated charcoal and furnish it to the combustion chamber. The components and mode of operation of this system is known to one skilled in the art. The connecting opening 30 and the adjoining recovery link have sufficiently large flow cross sections in order to be able to remove the amount of fuel vapor occurring during filling (FIG. 1).

During vehicle operation this large diameter connecting path is closed (FIG. 3), and a connecting path of a narrower diameter is established. To this end the connecting bore 24 is connected with a second recovery line with a narrower flow cross section, leading to the recovery container. A roll-over valve valve is inserted into the second recovery line. If the vehicle rolls over, the roll-over valve, controlled by gravity, is closed and prevents the outflow of fuel through the fuel vapor recovery line and the recovery container.

The further connecting bores 25 and 26 are used for connecting a pressure equalization line originating at the top of the vehicle tank, and an overflow line originating in a gas recovery chamber at the top of the fuel tank. During vehicle operation (FIG. 3) the pressure equalization line (connecting bore 25) is connected via the filler neck interior and the second recovery line with the fuel vapor recovery container. The function of the overfill line (connecting bore 26) is known to one skilled in the art; it is closed during the filling operation and permits the build-up of an air reserve in the gas recovery chamber of the vehicle tank. Following the termination of the filling process, the air reserve is vented into the upper end of the filler neck, so that the fuel in the filler neck runs into the tank.

The described valve functions can of course be achieved other than with the aid of the rotary and cross slide valve, any arbitrary selector valve known to technology can be employed instead. The invention is also suitable for applications in which an overflow line is omitted, in which case an appropriately reduced selector valve is used. The connecting bores for the pressure equalization line 25 and the second recovery line 24 could also be directly connected with each other during vehicle operation, i.e. without an interposed connection via the filler neck interior.

What is claimed is:

1. A closure device for a vehicle tank filler neck, which has an opening provided with a flap for the entry of the filling tube of a fuel pump nozzle, wherein the flap is prestressed against the lower edge of the opening by means of a spring, whereas an additional load in the closing direction is placed on the flap with the aid of a contact pressure device, and wherein the contact pressure device controls a selector valve which, when the flap is in a non-loaded position whereby there is no contact with the flap by the contact pressure device, connects the filler neck below the flap with a first recovery line leading to a fuel vapor recovery container, but in the position where the flap is under a load by tie contact pressure device, connects a pressure equalization line connected to the vehicle tank with a second recovery line leading to the recovery container, said second recovery line being of a narrower flow cross section than the first recovery line.

2. The closure device in accordance with claim 1, characterized in that if the flap is under a load by the contact pressure device, the selector valve connects the filler neck below the flap with an overfill line originating at a gas recovery chamber of the vehicle tank.

3. The closure device in accordance with claim 2, characterized in that the selector valve is a combined rotary and cross slide valve, wherein the first recovery line terminates at a circumference of a bushing in which the rotary and cross slide valve is seated and which is open toward the filler neck, while the pressure equalization line, the second recovery line and the overfill line terminate in a front plate of the bushing.

4. The closure device in accordance with claim 3, wherein the contact pressure device has a cam acting on a contact pressure finger attached to the flap, characterized in that the cam is fastened on an actuating shaft of the rotary and cross slide valve.

* * * * *